(12) United States Patent
Steenackers et al.

(10) Patent No.: US 6,536,548 B2
(45) Date of Patent: Mar. 25, 2003

(54) EXHAUST SYSTEM FOR A MOTOR VEHICLE AND MOTOR VEHICLE WITH AN EXHAUST SYSTEM

(75) Inventors: Pieter Delfina Steenackers, Heverlee (BE); John W. Jörg Alexnat, Tongeren (BE)

(73) Assignee: Scambia Industrial Developments AG, Schaan (LI)

( * ) Notice: Subject to any disclaimer, the term of this patent is extended or adjusted under 35 U.S.C. 154(b) by 0 days.

(21) Appl. No.: 09/910,101

(22) Filed: Jul. 20, 2001

(65) Prior Publication Data

US 2001/0047897 A1 Dec. 6, 2001

Related U.S. Application Data

(63) Continuation-in-part of application No. 09/466,240, filed on Dec. 17, 1999, now Pat. No. 6,298,935.

(30) Foreign Application Priority Data

Nov. 22, 2000 (CZ) .......................................... 2000-4345

(51) Int. Cl.$^7$ ............................................... E21F 17/02
(52) U.S. Cl. ......................... 180/89.2; 180/296; 248/58
(58) Field of Search ............................... 180/89.2, 296, 180/309; 248/610, 611, 58, 60, 62; 181/212, 227, 228; 29/890.08; 60/322, 687, 323

(56) References Cited

U.S. PATENT DOCUMENTS

| 2,288,172 | A | * | 6/1942 | Ulrich ........................ 248/610 |
| 2,367,753 | A | * | 1/1945 | Buck ....................... 29/890.08 |
| 3,276,108 | A | * | 10/1966 | White ..................... 29/890.08 |
| 3,745,632 | A | * | 7/1973 | Malkki et al. ............ 29/890.08 |
| 3,908,372 | A | * | 9/1975 | Fowler et al. ................. 60/320 |
| 3,977,486 | A | * | 8/1976 | Kleinschmit ................ 248/573 |
| 4,116,411 | A | * | 9/1978 | Masuda ....................... 248/610 |
| 4,349,078 | A | * | 9/1982 | Shimada et al. ........... 180/69.1 |
| 4,638,965 | A | * | 1/1987 | Bruine et al. ................. 248/59 |
| 4,796,841 | A | * | 1/1989 | Baker et al. ................ 248/610 |
| 5,323,989 | A | * | 6/1994 | Hamada et al. ............... 248/60 |
| 5,448,831 | A | * | 9/1995 | Harwood ................. 29/890.08 |
| 6,173,800 | B1 | * | 1/2001 | Steenackers et al. ....... 180/89.2 |
| 6,298,935 | B1 | * | 10/2001 | Steenackers et al. ....... 180/89.2 |

FOREIGN PATENT DOCUMENTS

JP           3136924        * 6/1991

* cited by examiner

Primary Examiner—Brian L. Johnson
Assistant Examiner—Bryan Fischmann
(74) Attorney, Agent, or Firm—Sidley Austin Brown & Wood, LLP

(57) ABSTRACT

The exhaust system has an exhaust comprising at least one silencer and/or catalytic converter which has a housing with a housing casing having a material thickness of not more than 1 mm and with housing ends. The exhaust furthermore has metallic pipes which are rigidly connected to said housing ends and at least one of which has a material thickness of, likewise, not more than 1 mm. The retaining element for holding the exhaust on the vehicle body has, for each housing end, a holder with a metallic retaining member connected to the pipe connected to the housing end or possibly to the housing itself. The at least one pipe having a material thickness of not more than 1 mm and to which the retaining member is connected or the housing casing to which the retaining member is connected is surrounded by a sleeve-like reinforcing element to which the retaining member is fastened, for example, by welding or brazing or adhesive bonding.

18 Claims, 7 Drawing Sheets

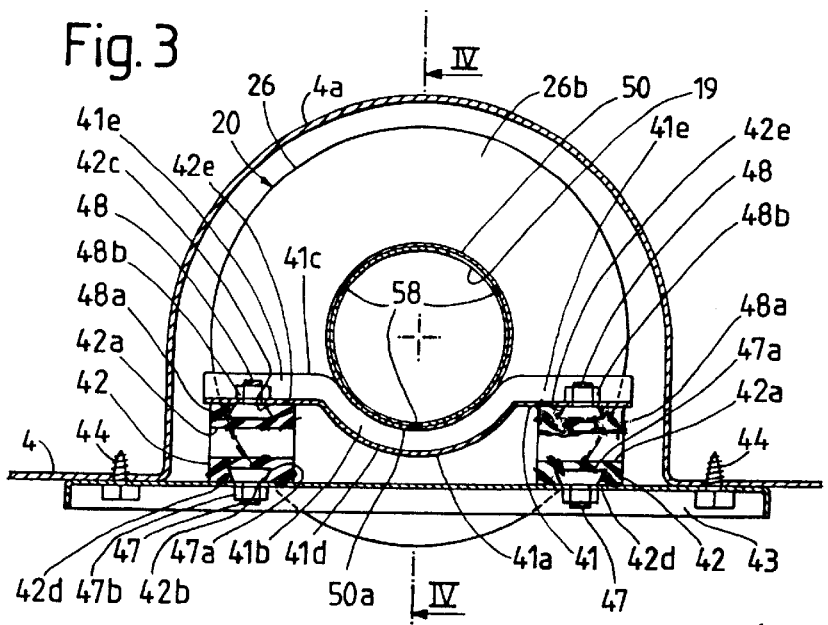
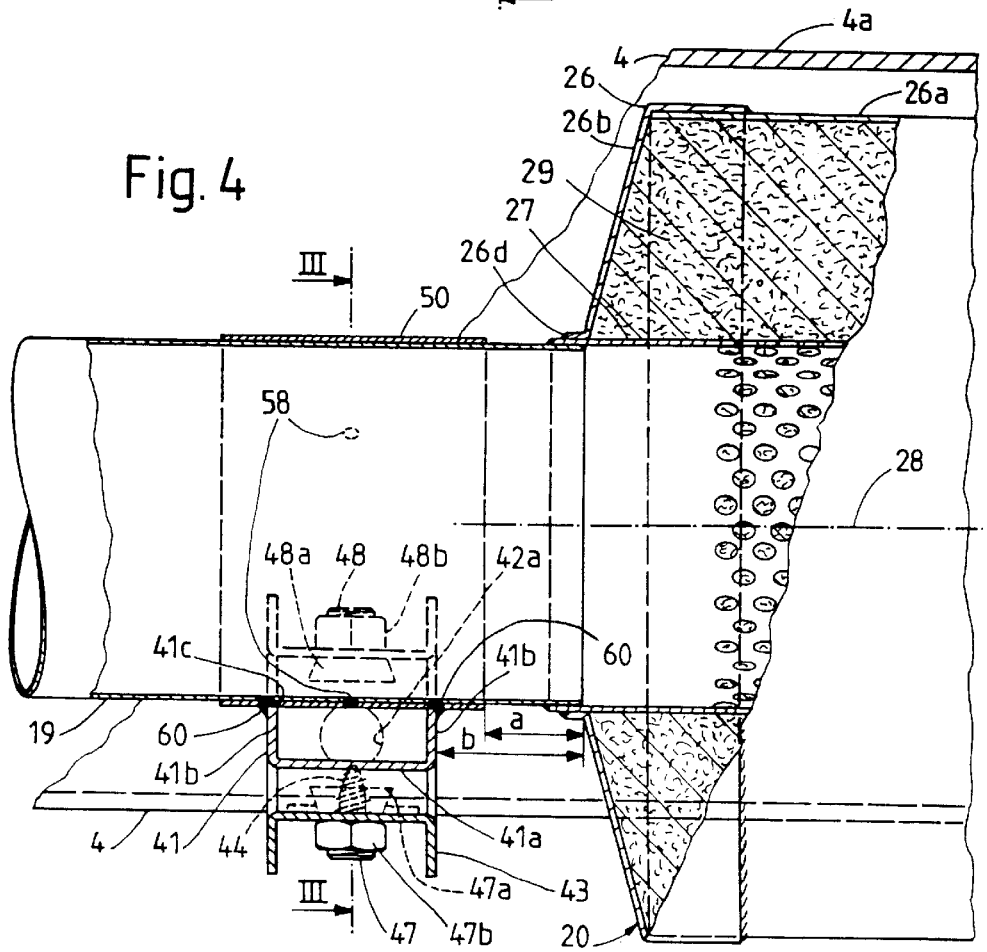

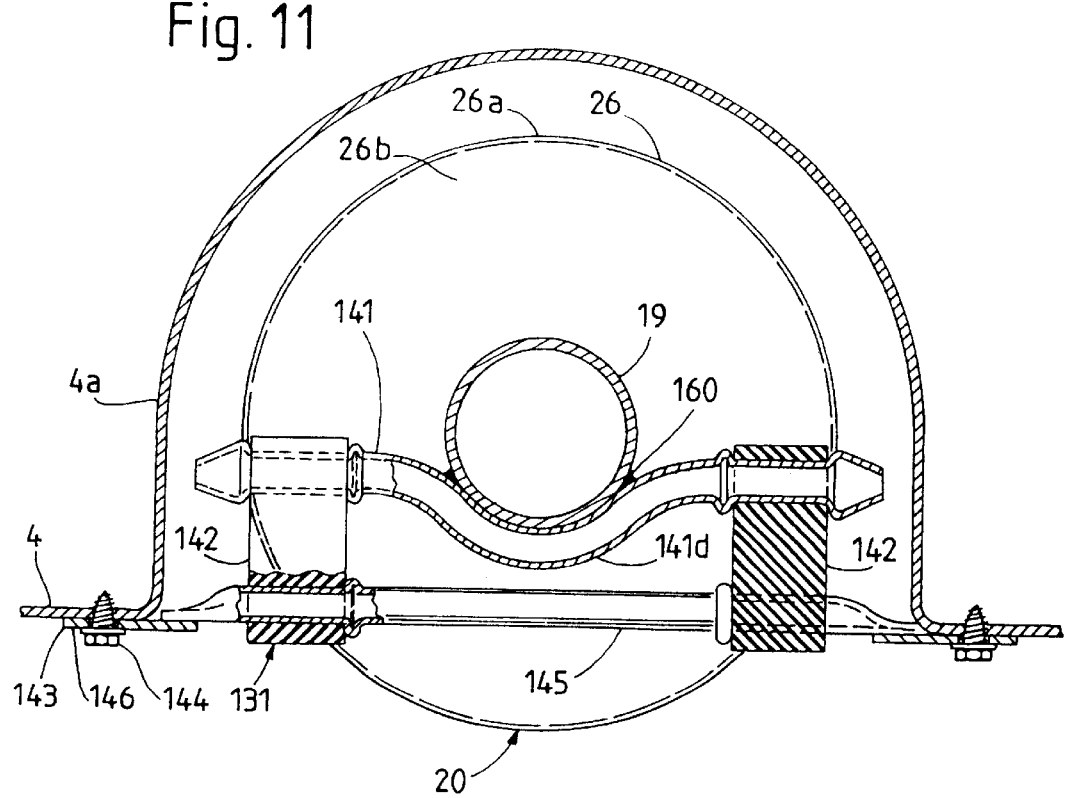

EXHAUST SYSTEM FOR A MOTOR VEHICLE AND MOTOR VEHICLE WITH AN EXHAUST SYSTEM

RELATED APPLICATIONS

This application is a continuation-in-part of application of Ser. No. 09/466,240, filed Dec. 17, 1999, now U.S. Pat. No. 6,298,935.

BACKGROUND OF THE INVENTION

1. Field of the Invention

The invention relates to an exhaust system for a motor vehicle comprising a vehicle body and an internal combustion engine. The exhaust system has an exhaust which is intended for connection to the internal combustion engine and has at least one housing of a silencer and/or of a catalytic converter with a housing casing, having essentially a material thickness of not more than 1 mm, and two housing ends, at least one of which is rigidly connected to a metallic pipe, having a material thickness of not more than 1 mm, for carrying the exhaust gas. The exhaust system furthermore has retaining means for holding the exhaust on the vehicle body.

The exhaust system is intended, for example, for a car but may also be used for another motor vehicle—for example a truck or bus. The internal combustion engine may be formed as a SI or diesel engine.

2. Description of the Prior Art

EP 0 807 749 A and the corresponding U.S. Pat. No. 6,058,702 disclose exhaust systems which have pipes, a catalytic converter and at least one silencer, at least one of the pipes, the casing and the end walls of the housing of the or each silencer having a material thickness of not more than 1 mm and, preferably, not more than 0.8 mm. Because of this light-weight construction, such an exhaust system has a very low weight. The exhaust systems have retaining means with holders which connect the housing of each silencer, in the vicinity of the housing ends, to the bottom of the vehicle. The holders have, for example, metallic retaining members fastened to the housing casing by spot welding or another welding method. Because of the small material thickness of the hosing casing, however, it is difficult to weld the retaining members in a stable manner to the housing casing without cracks and/or holes being formed in the latter during welding or later during the use of the motor vehicle. In addition, at least a part of the exhaust system and in particular at least one silencer are usually arranged on the underside of the vehicle bottom. There is generally only a small amount of space between the vehicle bottom and the surface on which the vehicle stands or drives. However, the holders fastened below or above the housing casing also occupy a certain height and may reduce the height region available for the housing casing and hence the maximum possible cross-sectional dimensions of the silencer and its silencing effect.

The U.S. Patent No. 3,270,992 discloses an exhaust system with a resonator and a tail pipe and a hanger for holding the tail pipe on the vehicle body. The hanger has an upper mounting bracket, a lower mounting bracket, a flexible loop connecting the two brackets to one another and a clamp. The clamp extends around the tail pipe, is tightened by a screw and secures a leg of the lower mounting bracket to the tail pipe.

U.S. Patent No. 3,270,992 does not disclose the wall thicknesses of the pieces and of the resonator housing. It seems probable that wall thicknesses usual in the prior art and amounting to at least about 1.5 mm were provided and that the exhaust is rather heavy. If the wall of the tail pipe were made thinner, it would likely be compressed at places and deformed by the asymmetric forces transmitted to the pipe by the clam and the leg of the lower mounting bracket disposed between the upper side of the pipe and the clamp when the clamp is tightened by the screw and/or when the exhaust is submitted to accelerations directed, for example, upward or downward. In this context, it should be noted that very great approximately vertical accelerations may be applied to the exhaust during the use of the vehicle, when the latter, for example, drives at high speed over a hole or a bump or the like. Moreover, movements, and particularly longitudinal movements, of the tail pipe may tilt the lower mounting bracket so that the latter presses strongly onto the upper side of the tail pipe and may deform the latter. Since the flexible loop is rather weak and moreover slidable relative to the upper mounting bracket, the tail pipe can moreover make large movements in more or less all directions. This is a further reason that the pipes must have rather thick and heavy walls for enabling them to bear large inertial stresses. The movable exhaust parts must also be large distances away from the vehicle body. This is particularly disadvantageous for exhaust parts arranged in the tunnel of the vehicle bottom.

An exhaust system disclosed in DE 297 11 764 U has a silencer. This is fastened at one of its ends with retaining means which have two curved rods consisting of an aluminium alloy and having a solid cross-section. The first of these two rods has a curved end section on which rest two likewise curved steel sleeves which are welded to one of the two end walls of the silencer. That end section of the first rod which faces away from the curved end section is connected by a rubber member to an end section of the second rod. Its other end section rests in a steel sleeve which is welded to a retaining element which in turn is fastened to the vehicle bottom.

DE 297 11 764 U contains no information about the material thicknesses of the pipes serving for carrying the exhaust gas and of the housing of the silencer. It therefore appears plausible that material thicknesses usual in the prior art and amounting to at least about 1.5 mm were provided, so that the exhaust is rather heavy. It would in particular also be virtually impossible to weld the steel sleeves resting on the first rod to a silencer end wall having a thickness of less than about 1.5 mm without cracks and holes forming in the housing during welding or later during the use of the motor vehicle. Furthermore, the steel sleeves are fastened only by being pressed onto the rods. Since the rods consist of an aluminium alloy, it would furthermore scarcely be possible to weld the steel sleeves to them. Since the housing of the silencer and hence the steel sleeves fastened to it are considerably heated temporarily during operation, thermally caused dimensional changes and deformations occur and may lead to loosening of the connection of the pressed-on sleeves to the first rod. Moreover, the steel sleeves arranged on the first rod must be curved the same way as the end section of the rods which hold them, which makes the manufacture more expensive. Furthermore, mounted between the rods consisting of an aluminium alloy and the steel sleeves is an insulating layer or insulating sheet which is required for preventing electrochemical corrosion and also makes the manufacture more expensive and may impair the strength and durability of the press fit. The retaining means disclosed in DE 297 11 764 U are furthermore scarcely suitable for mounting a silencer which is present in the tunnel of a vehicle bottom.

DE 30 26 730 A and DE 31 27 746 A disclose exhaust systems in which the housing of a silencer or pipes of the exhaust are suspended from the vehicle body by means of at least one rubber ring. If a force is exerted on an exhaust part held in this manner, the rubber rings initially offer only very little resistance to a deflection of the exhaust from its rest position. Only when the deflections of the exhaust part reach limits of about 1 cm to 2 cm or even more does the resistance generated by the rubber rings increase abruptly. Retaining means comprising at least one rubber ring therefore have the disadvantage that the or each suspended part is virtually freely movable in particular upwards and also in all approximately horizontal directions within certain ranges which are usually at least 1 cm or more. Exhaust parts suspended in this manner must therefore be large distances away from the vehicle body and—in the case of the arrangement in the tunnel of the vehicle bottom—in particular from the walls of the tunnel. Furthermore, exhaust parts suspended in this manner and the parts connected to them must have thick walls so that the exhaust is sufficiently strong.

SUMMARY OF THE INVENTION

It is the object of the present invention to provide an exhaust system which avoids disadvantages of the known exhaust systems and whose exhaust, particularly in the case of a thin-walled embodiment of the or each housing casing and of at least one pipe connected to the housing, can be connected permanently to the vehicle body by the retaining means without damage to the or each housing. Furthermore, it is intended to ensure that the or at least one housing can be readily accommodated in the tunnel of the vehicle bottom and can have a large vertical cross-sectional dimension. Furthermore, the retaining means should be capable of being economically manufactured and mounted and should permit good vibration damping.

This object is achieved according to the invention by an exhaust system for a motor vehicle having a vehicle body and an internal combustion engine, comprising an exhaust which is intended for connection to the internal combustion engine and has at least one housing of at least one of a silencer and a catalytic converter with a tubular housing casing, at least an essential part of which has a material thickness of not more than 1 mm, and two housing ends, at least one of which is rigidly connected to a metallic pipe having a material thickness of not more than 1 mm and intended for carrying exhaust gas, and comprising retaining means for holding the exhaust on the vehicle body, and at least one reinforcing element which at least approximately surrounds one of the metallic pipe and the housing casing in cross-section and is fastened to one of the pipe and housing case, wherein the retaining means comprises at least one holder having a metallic retaining member which adjoins an outside of the reinforcing element and is connected to the reinforcing element and to at least one vibration damping element intended for connection to the vehicle body.

According to another object of the invention, there is provided an exhaust system for a motor vehicle having a vehicle body and an internal combustion engine, comprising an exhaust which is intended for connection to the internal combustion engine, defines an exhaust gas flow path and has at least one deformable pipe element and at least one housing of at least one of a silencer and a catalytic converter arranged downstream of at least one flexible pipe element, wherein the housing has a tubular housing casing at least an essential part of which has a material thickness of not more than 1 mm, and two housing ends, at last one of which is rigidly connected to a metallic pipe having a material thickness of not more than 1 mm and intended for carrying exhaust gas, the exhaust system further comprising retaining mans for holding the exhaust downstream of the at least on deformable pipe element on the vehicle body, wherein the retaining means have a first holder along the flow path and at least one subsequent holder following the first holder along the flow path, wherein each holder comprises a retaining member rigidly connected to a part of the exhaust, a connecting element connectable to the vehicle body and at least one vibration damping element connecting the retaining member to the connecting element, wherein the retaining member of at least one of the holders is connected via a reinforcing element to one of at least one pipe and of the housing casing, wherein said reinforcing element at least approximately surrounds the one of the pipe and of the housing casing in cross-section, is fastened to one of the pipe and of the housing casing and has an outside which adjoins the retaining member, wherein the at least one vibration damping element of the first holder connects the retaining member to the connecting element without a possibility of a pivotal movement of the retaining member relative to the connecting element, and wherein the at least one vibration damping element of the at least one subsequent holder connects the retaining member to the connecting element of the at least one subsequent holder with a possibility of a pivotal movement of the retaining member relative to the connecting element of the at least one subsequent holder.

The invention also relates to a motor vehicle comprising such an exhaust system, a vehicle body and an internal combustion engine, wherein the exhaust is connected to the internal combustion engine, wherein the holders of the retaining means hold the exhaust on the vehicle body, wherein the at least one vibration damping element of the first holder connects the retaining member of the first holder in such a manner to the connecting element of the first holder that an acceleration of 10 m/s$^2$ acting on the exhaust in any direction deflects the retaining member of the first holder not more than 5 mm and wherein the at least one vibration damping element of the at least one subsequent holder connects the retaining element of this holder in such a manner to the connecting element of this holder that an acceleration of 10 m/s$^2$ acting on the exhaust in a direction which is approximately perpendicular to at least one of a longitudinal direction of the exhaust part held by the retaining member and of a line which connects centers of two housings disposed downstream of the at least one flexible pipe member deflects the retaining member of the at least one subsequent holder not more than 5 mm.

According to still another object of the invention, there is provided an exhaust system for a motor vehicle having a vehicle body and an internal combustion engine, comprising an exhaust which is intended for connection to the internal combustion engine, defines an exhaust gas flow path and has a last one deformable pipe element and at least one housing of at least one of a silencer and a catalytic converter arranged downstream of the at least one flexible pipe element, wherein the housing has a tubular housing casing, at least an essential part of which has a material thickness of not more than 1 mm, and two housing ends, at least one of which is rigidly connected to a metallic pipe having a material thickness of not more than 1 mm and intended for carrying exhaust gas, the exhaust system further comprising retaining means for holding the exhaust downstream of the at least one deformable pipe element on the vehicle body, wherein the retaining means have a first holder and at least one subsequent holder following the first holder along the flow path, wherein each holder comprises a retaining member, a connecting element connectable to the vehicle body and two vibration damping elements, wherein the retaining member of each holder has a middle section and two arms which project away on opposite sides of the middle section, wherein the middle section of the retaining member of each holder is rigidly connected to a part of the exhaust, wherein each arm of the retaining member is connected by one of the vibration damping elements to the connecting element, wherein the vibration damping elements of the first holder connect the retaining member to the connecting elements without a possibility of a pivotal movement of the retaining member relative to the connecting elements, and wherein the vibration damping elements of the at least one subsequent holder connect the retaining member to the connecting element of the at least one subsequent holder with a possibility of a pivotal movement of the retaining member relative to the connecting element of the at least one subsequent holder.

An exhaust system according to the invention has at last one silencer and/or catalytic converter whose housing has a tubular casing having a material thickness or wall thickness of an essential part thereof which is 1 mm or less. Furthermore, at least one and, preferably, each pipe connected to the housing, and, preferably, each end wall of the housing, has a material thickness or wall thickness of not more than 1 mm. The material thicknesses of the housing casing, of the housing end walls, and of the or each said pipe are preferably not more than 0.8 mm and, for example, 0.5 mm to 0.7 mm or, possibly, even less than 0.5 mm. The material thickness or wall thickness of the or each reinforcing element is expediently likewise not more than 1 mm, preferably not more than 0.8 mm and, for example, about 0.5 mm to 0.7 mm.

According to the invention, the metallic retaining member of at least one holder and, for example, of each holder of the retaining means is fastened via a reinforcing element to a pipe or possibly via a reinforcing element to a housing casing, whose material thickness is not more than 1 mm and, for example, not more than 0.8 mm. According to the invention, the or each reinforcing element is fastened to an exhaust part, i.e. to a pipe or possibly to the housing casing of the or of a housing, in such a way that the exhaust part holding the reinforcing element, i.e. the pipe or the housing casing, is at least approximately and preferably completely enclosed by the reinforcing element in cross-section. The inner surface of the or each reinforcing element can then contact the outer surface of the pipe or housing casing and adjoin tightly this outer surface at least approximately around and preferably completely around the pipe or tubular housing casing. The or each reinforcing element increases the area over which forces can be transmitted between the pipe or housing casing provided with the reinforcing element and the retaining member connected to the outside of the reinforcing element. Thus, the or each reinforcing element disposed between an exhaust part, i.e. a pipe or housing casing, and a retaining member distributes such forces over a great area. The pipe or the housing casing is reinforced by the reinforcing element in such a way that the pipe or the housing casing is not damaged either by the fastening of the retaining member or subsequently by the forces exerted on the exhaust during the use of the motor vehicle. The reinforcing element ensures in particular that, in spite of the small material thickness of the pipe or housing casing, no cracks and leaks form in the pipe or housing casing. The invention thus permits the exhaust to be made very light and nevertheless to be connected well and permanently to the vehicle body.

The or each reinforcing element is preferably essentially sleeve-like and consists, for example, of a one-piece sleeve which is closed along its circumference and completely encloses the pipe or the housing casing in cross-section and is cohesive, without interruption, along its circumference. The or each reinforcing element is, for example, pressed onto the pipe or the housing casing and thus connected to it by a press fit. The or each reinforcing element can furthermore be nondetachably fastened to the pipe or housing casing additionally or instead by at least one weld joint or at least one brazing joint or by plastic deformation, for example by crimping and/or bead formation, or possibly by at least one adhesive bond. The or each metallic retaining member connected with the aid of a reinforcing element to a pipe or housing casing is preferably connected nondetachably to the reinforcing element by welding or brazing or possibly by adhesive bonding.

In a particularly advantageous embodiment of the invention, two holders each having a metallic retaining member are coordinated with the or at least one housing and, for example, each of the housings, each retaining member being connected, in the vicinity of one of the housing ends, via a reinforcing element, to a pipe fastened to the relevant housing end. The housing may then be free of retaining means contacting the housing. If one of the pipes fastened to a housing is very short and, for example, has a length which is only slightly greater than the width of a retaining member, this pipe may possibly have a wall thickness or material thickness of more than 0.8 mm and even more than 1 mm. In such a case, one of the retaining members may be fastened directly to this pipe instead of via a reinforcing element. If the exhaust has two housings which follow one another in succession a very small distance apart along the flow path of the exhaust gas and are connected to one another by a very short pipe, a holder common to these two housings may be provided with a retaining member which is fastened, via a sleeve-like reinforcing element or directly, to the pipe connecting the two housings. In the case of such an embodiment, the exhaust part having the two housings may be mounted by means of three holders, each of which has a retaining member connected to a pipe. Because the retaining means are connected to pipes and need not engage the housing of a silencer and/or a catalytic converter, it is possible, for example, for a housing in a tunnel with predetermined cross-sectional dimensions to have a greater vertical cross-sectional dimension than if retaining means were to engage the housing casing.

The or each retaining member fastened with the aid of a reinforcing element may be connected to the reinforcing element, for example, by at least one weld joint or at least one brazing joint. Preferably, two weld seams or brazing seams serving as connections are present, which seams run approximately transversely to the exhaust pipe carrying the exhaust gas or the housing casing along retaining member sections and are offset relative to one another in the longitudinal direction of the pipe and thus along the general flow path of the exhaust gas. If a retaining member is connected to the coordinated reinforcing element by welding, the retaining member, the reinforcing element and the exhaust pipe can be connected to one another by at least one common weld joint or weld seam which penetrates the sleeve-like reinforcing element and which was produced in a single welding operation during the manufacture of the exhaust system.

If the or each retaining member is fastened to the coordinated reinforcing element by brazing, the brazing is preferably effected not in an oven but with the aid of an apparatus which has an electrode for generating an electric arc. The electrode may consist, for example, at least partly of hard solder, so that it can be melted off from the electrode during brazing. Alternatively, it is possible to use a non-melting electrode and to feed a separate wire consisting at least partly of hard solder and to melt this in the arc. The apparatus used for brazing may be formed similarly to an electric arc welding apparatus and, for example, may also have means for producing an inert gas envelope surrounding the arc. For the brazing, it is possible to use an apparatus which, instead of an electrode, has a gas burner which produces a flame analogously to autogenous welding. Moreover, the statement made above with respect to the connection of a retaining member and of a reinforcing element to a pipe of the exhaust is applicable in an analogous manner to any connection of a retaining member and a reinforcing element to a housing casing, provided that there are no contradictions. The connections of the retaining member to the reinforcing element which are effected both by welding and by brazing or possibly by adhesive bonding permit economical and permanent fastening of the retaining member, so that the exhaust system is not only light but also economical.

The normal position of the motor vehicle is also to be defined here. This is understood as meaning that position of the motor vehicle in which it rests with its wheels on a flat horizontal surface.

Each metallic retaining member is preferably connected via at least partially elastomeric damping elements to a metallic connecting element which, together with the retaining member and the damping elements, forms a holder and is fastened to the vehicle body of the motor vehicle when the exhaust system is mounted. The at least partly elastomeric damping elements are vibration-damping, so that vibrations of the exhaust system are not transmitted to the vehicle body and, conversely, vibrations thereof are not completely transmitted to the exhaust system which is sensitive particularly in the light-weight construction. These damping elements consist, for example, at least partly of an elastomeric member. However, the elastomeric members should be sufficiently rigid that they are only slightly deformed by the accelerations in forces occurring during driving of the motor vehicle, in all possible directions. According to an advantageous embodiment of the motor vehicle according to the invention, the retaining means are designed in such a way that each retaining member is connected to each elastomeric member at a connection point which is above the connection point or the connection points at which the elastomeric member is connected to the connecting element. Consequently, with a suitable arrangement, it is possible to ensure that, in the normal position of the motor vehicle, the elastomeric members are loaded by the weight of the exhaust essentially only under pressure and, if the elastomeric material breaks, the exhaust does not fall onto the driving surface but is still supported by the connecting elements.

BRIEF DESCRIPTION OF THE DRAWINGS

Embodiments of the exhaust system according to the invention, of the motor vehicle and of the process for manufacturing the exhaust system are described below with reference to a drawing. In the drawing, FIG. 3 shows a cross-section through the bottom of the motor vehicle, along the line III—III of FIG. 4, FIG. 4 shows a longitudinal section along the line IV—IV in FIG. 3, but on a larger scale than FIG. 3, FIG. 11 shows a cross-section through a pipe connected to the inlet end of a silencer and through the holder connected to said pipe.

DESCRIPTION OF THE PREFERRED EMBODIMENTS

Figure 1:
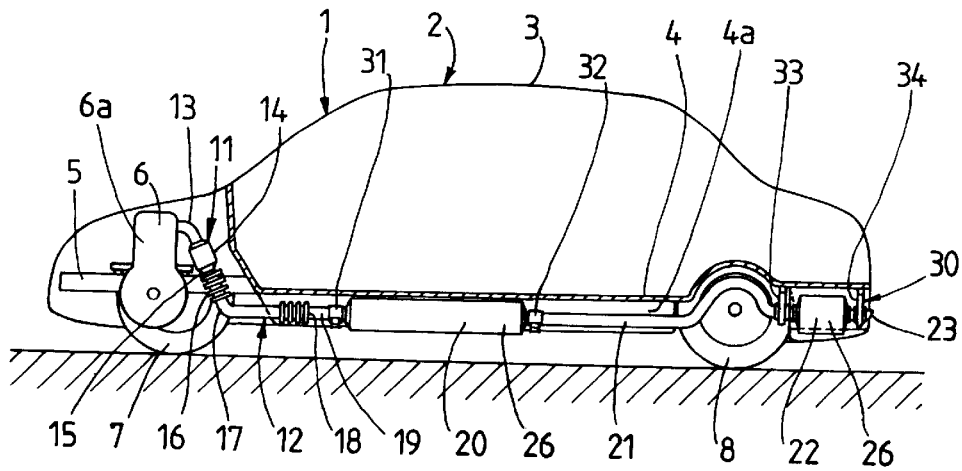
FIG. 1 shows a very schematic longitudinal section through a motor vehicle.

The motor vehicle 1 shown schematically in FIG. 1 is a car and has a vehicle body 2. This has a self-supporting bodywork 3, a vehicle bottom 4 and a chassis 5. The vehicle body 2 holds an internal combustion engine 6, front wheels 7, rear wheels 8 and an exhaust system denoted as a whole by 11. The internal combustion engine 6 has an engine housing 6a fastened in a vibration-damping manner to the chassis 5 and having a plurality of exhaust gas outlets, each of which is coordinated with a cylinder of the engine. The exhaust system 11 has, as a main component, an exhaust 12. This has various exhaust parts for carrying the exhaust gas and bounds a flow path for said exhaust gas. The exhaust has, for example, in order in the direction of flow of the exhaust gas, an inlet and collecting apparatus 13, a catalytic converter 14, a connection 15, a first elastically deformable pipe element 16, a bent pipe 17, a second elastically deformable pipe element 18, a short pipe 19, a first silencer 20, a longer, bent pipe 21, a second silencer 22 and a short outlet pipe 23 opening into the environment. The internal combustion engine 6 is at the front end of the motor vehicle 1. The exhaust 12 extends from the internal combustion engine to the rear of the motor vehicle 1 and is for the most part underneath the vehicle bottom 4. The exhaust system 11 furthermore comprises retaining means 30. These have four holders 31, 32, 33, 34 which connect the pipes 19, 21, 23 of the exhaust 12 to a rigid part of the vehicle body 2, namely to the vehicle bottom 4. Considered in the direction of flow, one holder each is mounted in front of and behind each silencer 20, 22 and in the vicinity thereof, so that each silencer is connected to the vehicle bottom via short pipe sections and two holders coordinated with it.

The inlet and collecting apparatus 13 has an exhaust manifold which has a bent inlet pipe for each exhaust gas outlet of the engine and a common exit for all inlet pipes. The catalytic converter 14 has a rigid housing with an entrance which is connected rigidly to the common exit of the inlet and collecting apparatus 13. The inlet and collecting apparatus 13, the housing of the catalytic converter 14 and the pipes 17, 19, 21, 23 and any pipe present at the connection 15 consist of metallic materials, for example stainless steel or possibly another steel, and are rigid. The pipes 17, 19, 21 and 23 and possibly any pipe present at the connection 15 are manufactured as light-weight constructions, i.e. they have wall thicknesses or material thicknesses of not more than 1 mm, preferably not more than 0.8 mm and, for example, about 0.5 mm to 0.7 mm. The various pipes which serve for carrying the exhaust gas are, for example, circular in cross-section. The two elastically deformable pipe elements 16 and 18 have, for example, a flexible, pliable bellows which consists of stainless steel and can be lengthened and shortened. The successive exhaust parts 13 to 23 are connected tightly to one another, for example welded or connected by brazing.

Figure 2:
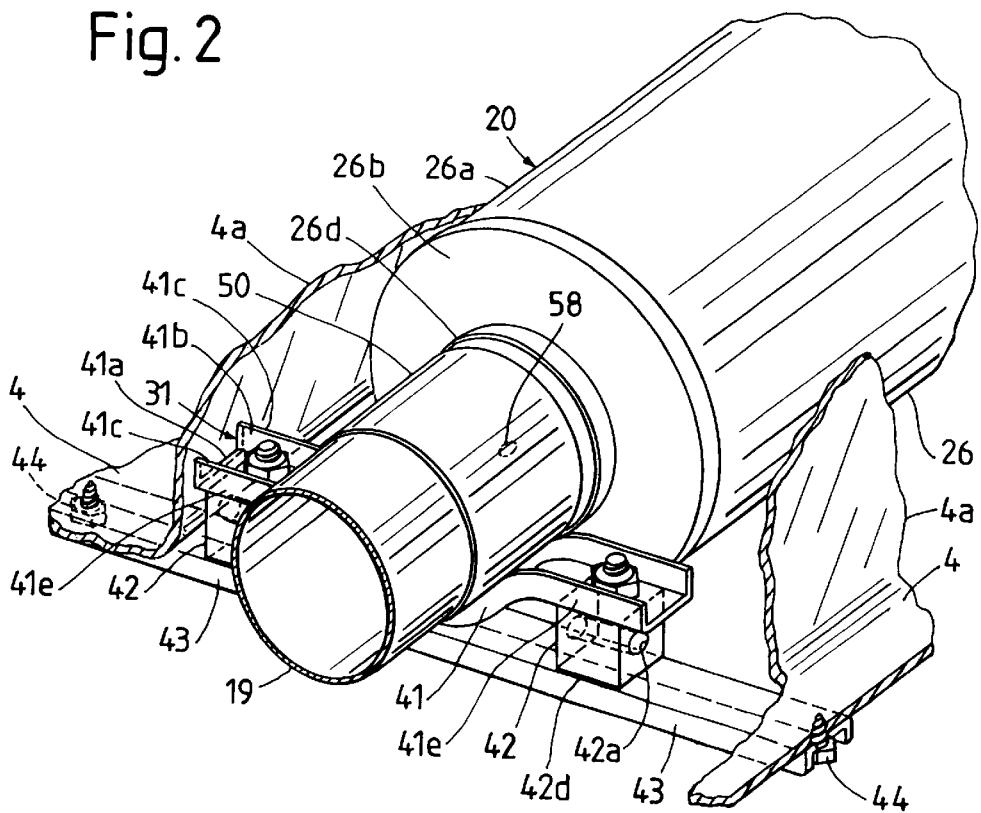
FIG. 2 shows an oblique view of a part of a silencer of an exhaust system according to the invention.
Figure 5:
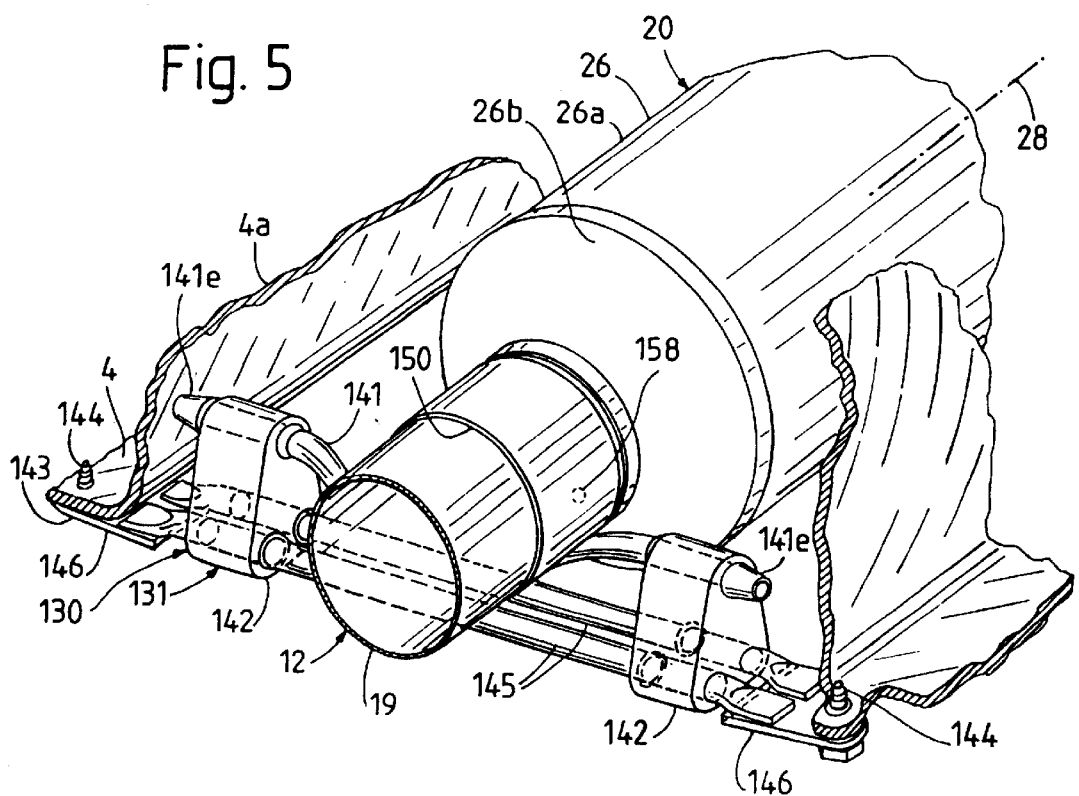
FIG. 5 shows an oblique view of the inlet end of a silencer of an exhaust system having different retaining means.
Figure 6:
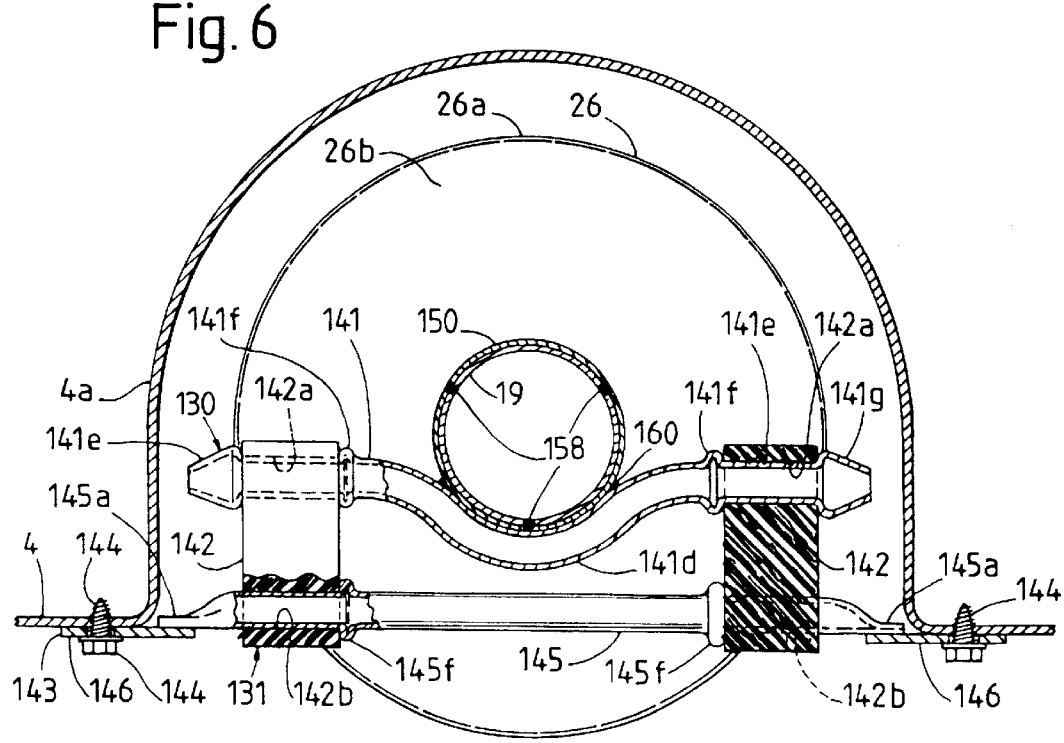
FIG. 6 shows a cross-section through the pipe connected to the inlet end of the silencer according to FIG. 5 and through the holder connected to said pipe.

Each of the silencers 20, 22 has a housing 26, of which that of the silencer 20 is also shown in FIGS. 2, 3 and 4. Each housing 26 consists of a metallic material, for example stainless steel or another steel, and has a tubular housing casing 26a and two end walls 26b. The housing casing 26a of each silencer is circular in cross-section, for example according to FIG. 3, but could instead be more or less oval, and defines the housing axis 28. The housing casing 26a is preferably free of retaining means engaging it. The housing end walls make for the most part essentially an angle with the housing axis 28 and are, for example, approximately conical but could instead be perpendicular to the housing axis or curved, at least in parts, in axial section. The actual end wall making an angle with the housing axis is associated at its outer edge and in the central region with a short, approximately axial outer or inner collar and, together with this collar, consists of one sheet-metal piece. The outer collar overlaps an edge region of a sheet-metal piece forming the main part of the casing and is connected thereto, for example by welding or brazing. The inner collar forms a housing end 26d which is intended for connection to further exhaust parts, namely pipes. Furthermore, the silencer has, for example, at least one perforated inner pipe 27 and at least one interior region filled with a fibre material 29, such as, for example, glass fibres, basalt fibres, rockwool or a similar material. The inner collar of each end wall 26b bounds an orifice which, for example, is coaxial with the housing axis 28 but could also be offset therefrom. The inner collar of the end wall 26b shown in FIGS. 2 and 4 forms the inlet housing end 26d of the first silencer 20 and is connected by weld joints or brazing joints to the inner pipe 27 and via this to the pipe 19 of the exhaust. The other housing end walls of the two silencers are each connected to an end of one of the pipes 21, 23 and possibly also to an inner pipe. Those end sections of the pipes 19, 21, 23 which connect to the housings of one of the silencers have pipe axes which are parallel to the housing axis of the relevant housing and, for example, coincide with these housing axes. The housing casings and housing end walls of the two silencers have essentially, i.e. apart from the overlapping collars and edge regions, a wall thickness or material thickness of the order of magnitude stated in the introduction. The inner pipe 27 and the end wall 26b of the housing and the inner pipe and the exhaust pipe 19, 21 or 23 are each rigidly connected to one another, for example soldered or welded.

FIGS. 2, 3 and 4 show a section of the vehicle bottom 4. This is in general more or less flat but has an upward-projecting bulge. This bounds a tunnel 4a which is open at the bottom and in which at least a part of the exhaust 12 and in particular at least a cross-sectional area of the first silencer 20 are located.

As already mentioned, the retaining means 30 have four holders 31, 32, 33 and 34, of which the holder 31 is shown in FIGS. 2 to 4. The holder 31 is formed by a retaining member 41, two vibration damping elements 42 and a connecting element 43. The retaining member 41 and the connecting element 43 consist of metallic material, for example stainless steel. Each vibration damping element consists at least partly and, for example, completely of a one-piece, elastomeric member of synthetic and/or natural rubber. The connecting element 43 is elongated and straight and consists of a U-profile rod which has, on its upper side, a web and two limbs projecting downwards away from said web and, for example, at its ends, end sections which are angled and/or bent away downwards likewise away from the web. The connecting element 43 is, for example, straight and extends transversely to the tunnel 4a and to the housing axis 28 parallel to said tunnel, rests with its web on both sides of the tunnel against the lower surface of the vehicle bottom 4 and is rigidly connected thereto and in fact fastened thereto by means of bolt 44. The damping elements 42 are, for example, essentially right parallelepiped and have a through-hole 42a extending transversely to the housing axis 28, and recesses 42b and 42c, in each of which a head 47a, 48a of a bolt 47 and 48, respectively, is located. The bolt heads 47a, 48a are connected firmly and in an interlocking manner to the damping element 42, for example by casting on and/or vulcanizing on the rubber. The bolts 47, 48 may therefore be regarded as parts of the damping element. The undersides 42d of the elastomeric members of the damping elements rest on the connecting element 43 and possibly on the upper side of the bolt heads present there and are fixed to the connecting element by means of the bolts 47 and nuts 47b screwed onto them. The retaining member 41 has a U-profile in cross-section and possesses, on its lower side, a web 41a and two limbs 41b which project upwards away from said web and have free edges 41c at the top. The retaining member has a middle, curved section 41d and two essentially straight arms 41e projecting away from said section. The middle section 41d forms an arc concentric with the pipe 19. The arms 41e rest on the top 42e of the damping elements 42 and possibly on the top of the bolt heads present there and are supported by these. The bolts 48 and the associated nuts 48b serve for fixing the retaining member 41 on the damping elements 42.

The pipe 19 is surrounded in cross-section by a sleeve-shaped reinforcing element which is referred to below as sleeve 50 and consists of a metallic material, for example of stainless steel. The sleeve 50 is cylindrical, circular in cross-section and straight in the axial direction. The reinforcing element or the sleeve 50 rests tightly against the pipe 19 and is, for example, pressed onto said pipe and/or fixed on the pipe 19 by at least one spot weld joint 58, it being possible, for example, for a few spot weld joints 58 to be distributed along the circumference of the reinforcing element. The material thickness or wall thickness of the sleeve is in the range stated in the introduction and is, for example, about 0.5 mm. The sleeve 50 is coordinated with the retaining member 41, which adjoins the outside of the sleeve. The sleeve 50 is slightly broader than the retaining member 41 and rests, with a circumferential section 50a present on its lower side, in the curved section 41d of the remaining member 41, on those edges 41c of the limbs 41b which face away from the web 41a. Each edge 41c of a limb 41b is a small distance away from that end of the sleeve 50 which is closer to it. Each of the two edges 41c adjacent to the sleeve 50 is connected to the sleeve essentially along the entire circumferential section 50a of the sleeve 50 by a weld joint 60, namely a weld seam. The melt zone of the weld joint 60 penetrates through the wall of sleeve 50 into the wall of the pipe 19. Each weld joint 60 therefore firmly and nondetachably connects both the retaining member 41 to the sleeve 50 and this to the pipe 19.

The sleeve 50 and the retaining member 41 are present as close to the housing 26 of the silencer as is easily feasible in terms of manufacturing technology. In FIG. 4, a denotes the distance of that end of the sleeve 50 which is closer to the housing 26 from the point, located closest to the sleeve and outermost in the axial direction, of the actual end wall 26*b* making an angle with the housing axis. In FIG. 4, furthermore, b denotes the distance of that point of the retaining member 41 which is located closest to the housing 26 from the point, located closest to said retaining member, of the end wall 26*b* present at the relevant housing end. Said point of the retaining member is formed by its limb 41*b* located closer to the housing. Said point of the end wall 26*b* is located at the inner edge thereof, at which the conical end wall is associated with the inner, axial collar. The distances a and b are measured parallel to the housing axis 28, along the pipe 19 and its pipe axis coinciding with the housing axis 28. The distance b is not more than 5 cm, preferably not more than 3 cm and, for example, about 2 cm or even less. The distance a is, for example, about 1 mm to 10 mm less than the distance b and is accordingly likewise not more than about 5 cm, expediently not more than 4 cm and preferably not more than 2 cm.

The holder 32 is formed identically or similarly to the holder 31.

If the motor vehicle occupies the normal position defined in the introduction, the lowest point of the housing 26 of the first silencer 20 is lower than the lowest points of the two retaining members 41 which are coordinated with the first silencer and are located slightly upstream or downstream thereof. The whole retaining members 41 are therefore above the lowest point of the silencer 26. The housing 26 of the first silencer 20 furthermore projects, for example according to FIG. 3, out of the tunnel 4*a* in the downward direction, so that the lowest point of this housing in the normal position is approximately at the height of the lowest point of the connecting elements 42 and of the whole holders 31, 32 or even below these. Furthermore, the two metallic retaining members 41 coordinated with the first silencer, and at least the greatest parts of the damping elements 42 fastened to these retaining members, can be arranged inside the tunnel.

The second silencer 22 and its housing 26 are located, for example, behind the tunnel 4*a*. The two holders 33, 34 coordinated with this silencer and serving for indirectly holding said silencer are formed partly similarly to the holders 31, 32 and likewise have, for example, a connecting element, two damping elements and a retaining member which is fastened to a sleeve-like reinforcing element 50 pushed onto the corresponding exhaust pipe. The retaining members 41 of the two holders 33, 34 are arranged, for example analogously to the retaining members 41 of the holders 31, 32, on the lower side of the reinforcing elements 50 and pipes 21 or 23 supported by them. The damping elements of the holders 33, 34 can likewise be formed identically or similarly to those of the holders 31, 32. On the other hand, the connecting elements of the two holders 33, 34 are then, for example, angled or bent or provided with additional parts in such a way that they can be fastened, for example above the second silencer, to the vehicle bottom 4 and possibly to another part of the vehicle body.

The exhaust 12 is connected to the vehicle bottom 4 by the retaining members 30 consisting of the holders 31, 32, 33 and 34, the bolts 44 and the sleeves 50. Since the vibration damping elements are resilient, each pipe 19, 21, 23 can move against the resistance of a force generated by the damping elements 42 during a deflection from their rest position. In this way, the damping elements 42 ensure that vibrations transmitted from the internal combustion engine to the exhaust system 11 are not transmitted to the chassis 5. Because the damping elements 42 are essentially right parallelepiped and have a through-hole 42*a*, movements in different directions are not opposed by the same resistance. The vibration damping elements of each holder are preferably so rigid that accelerations of 10 m/s$^2$ or even 30 m/s$^2$ acting on the exhaust and particularly on the exhaust parts held in all directions at right angles to the longitudinal direction of the parts held cause only deflections of not more than 5 mm, preferably not more than 2 mm and advantageously of not more than 1 mm. Thus, for example, movements in the vertical direction are essentially braked, so that only small deflections are possible. On the other hand, the holes 42*a* ensure that deflections in the longitudinal direction of the housings of the silencers are opposed by less resistance. Consequently, in the case of longitudinal expansions of the exhaust 11 due to its being heated up during operation, the damping elements 42 are deformed without excessively large forces being exerted on the weld joints 60, although the two silencer housings are connected to one another by the pipe 21 without inclusion of a bellows or other pipe elements variable in length.

In the manufacture of the exhaust system, the inlet and collecting apparatus 13, the catalytic converter 14, the connection 15 the deformable pipe elements 16, 18, the pipes 17, 19, 21, 23, the silencers 20, 22 and the various parts of the holders 31, 32, 33, 34 are procured and/or produced in a first step. Thereafter, the reinforcing elements or sleeves 50 are pushed onto the pipes 21, 19 and 23 and temporarily fixed. The fixation can be achieved, for example, by pressing of the sleeve-shaped reinforcing element onto the relevant pipe and a resultant press fit and/or by the above mentioned spot weld joints 58 which may be present. Thereafter, the sleeve 50 is placed on the curved section 41*d* of a retaining element 41 and welded to the edges 41*c*. The time for which an arc or a welding frame acts on the reinforcing element 50 is tailored to its thickness in such a way that each weld joint 60 simultaneously also connects the pipe and the sleeve 50 to one another, and the reinforcing element is fused with the pipe at each weld joint 60. The welding process is carried out in such a way that no holes or leaks form in the pipe. Furthermore, before or after the retaining members 41 are welded on, the two silencer housings are connected to the pipes 19, 21, 23 by welding or brazing, and furthermore the other exhaust components are connected to one another by welding and/or by brazing.

FIGS. 5 to 9 show sections and parts of a vehicle bottom 4 having a tunnel 4*a* and parts of a variant of the exhaust system. This has an exhaust which is formed, for example, substantially identically or similarly to the exhaust according to FIGS. 1 to 4 and, like this, is denoted by 12. The exhaust of the exhaust system as shown in FIGS. 5 to 9 also has in particular a first silencer with a housing and pipes connected to said housing and serving for carrying the exhaust gas, these exhaust parts being denoted by the same reference numerals as in the embodiment according to FIGS. 1 to 4. On the other hand, the exhaust system according to FIGS. 5 to 9 has retaining means which are somewhat differently formed and are denoted by 130. These have two holders 131, 132 arranged in the vicinity of the two ends of the first silencer 20, and two holders arranged in the vicinity of the second silencer not shown in FIGS. 5 to 9. The first holder 131 arranged at the inlet housing end 26d of the first silencer 20 has a metallic retaining member 141, two at least partly elastomeric vibration damping elements 142 and a metallic connecting element 143. The retaining member 141 is connected, in a manner described in even more detail, to the pipe 19 by means of a metallic reinforcing element denoted in this variant by 150. The reinforcing element 150 is coordinated with the first holder 131 and may possibly likewise be considered as part of this holder and is in turn formed by a cylindrical sleeve which is circular in cross-section and straight in the axial direction, surrounds the pipe 19 in cross-section completely and without interruption along its circumference and rests tightly and nondisplaceably on the pipe.

The retaining member 141 is formed as an elongated hollow rod, i.e. as a thin tube whose diameter is substantially smaller than that of the exhaust pipes carrying exhaust gas. The retaining member 141 was originally cylindrical, circular in cross-section and straight but was plastically deformed and has a middle, curved section 141d. This forms an arc which is concentric with the pipe 19 which is circular in cross-section. The middle, bent section 141d of the retaining member 141 or thin pipe is, for example, approximately circular or more or less squashed together in cross-section. The retaining member 141 has, on both sides of the middle, curved section 141d, an arm 141e projecting away from said section. Each of the two arms 141e has a straight, cylindrical section circular in cross-section and, at both ends of said section, a bead 141f or 141g, respectively, formed by plastic deformation. The outer bead 141g of each arm is further away from the middle section 141d and tapers approximately conically towards the free end of the retaining member, so that the diameter of the retaining member at the free end thereof is at most equal to the diameter of the cylindrical arm section present between the two beads and, for example, slightly smaller than this diameter.

Each vibration damping element 142 of the first holder 131 has an elastomeric member and consists, for example, completely of such a member. Each damping element 142 formed by an elastomeric member has three cylindrical through-holes circular in cross-section and parallel to one another, namely an upper hole 142a and two lower holes 142b arranged side by side. Each damping element 142 belonging to the first holder has, in a direction of view parallel to its holes, approximately the shape of an equilateral triangle having a base located below the two lower holes and two limbs or sides inclined towards one another in an upward direction, but the corners are replaced by arcs.

The connecting element 143 is elongated and has two hollow rods 145 formed as thin pipes and two end pieces 146. The hollow rods 145 are generally cylindrical and are circular in cross-section but have end sections 145a which are flattened at both ends. Each hollow rod 145 furthermore has two beads 145f formed by plastic deformation. Two hollow rods 145 or thin pipes have substantially smaller diameters than the pipes of the exhaust, are parallel to one another and are, for example, essentially straight.

That cylindrical section of each arm 141e of the retaining member 141 which is present between two beads 141f, 141g passes through the upper hole 142a of one of the damping elements 142. Those sections of the hollow rod 145 which are located between an end section 145a and a bead 145f pass through one of the lower holes 142b of one of the damping elements 142. The beads 141f, 141g and 145f rest against the damping elements 142 and secure these to prevent them from being displaced along the hollow rods 141 and 145. When assembling a holder, the damping elements 142 can be pushed, with temporary elastic deformation, onto the retaining member 141 consisting of a hollow rod and onto the two hollow rods 145 of the connecting element 143 and then connect the retaining member 141 to the connecting element 145 of the first holder 121 in a vibration-damping manner. Each end piece 146 consists of a flat lamella and is connected by welding or brazing to the flattened end sections 145a of each of the two hollow rods 145. Each end section 145 has at least one hole so that, during mounting of the exhaust, it rests against the lower surface of the vehicle bottom 4 and can be fastened to it by means of at least one bolt 144.

The reinforcing element 150 is, for example, pressed onto the pipe 19 and is rigidly connected to the pipe 19 by a press fit and/or by at least one spot weld joint 158 and preferably by two or more spot weld joints 158 distributed along the circumference. The middle, curved section 141d of the retaining member 141 rests along an arc on the outside of the reinforcing element 150 and is connected by at least one brazing joint 160 rigidly to the reinforcing element 150 which thus rigidly connects the retaining member to the pipe 19. According to FIG. 8, the middle section 141d is connected, in a cross-section passing through it, on, both sides of its surface line present closest to the reinforcing element and adjacent to it, by in each case one brazing joint 160 or brazing seam 160 to the reinforcing element. These two brazing joints extend along the whole part of the retaining member 141, which part is adjacent to the reinforcing element, and may be consecutive, for example at the points at which the retaining member 141 projects away from the retaining element.

Figure 9:
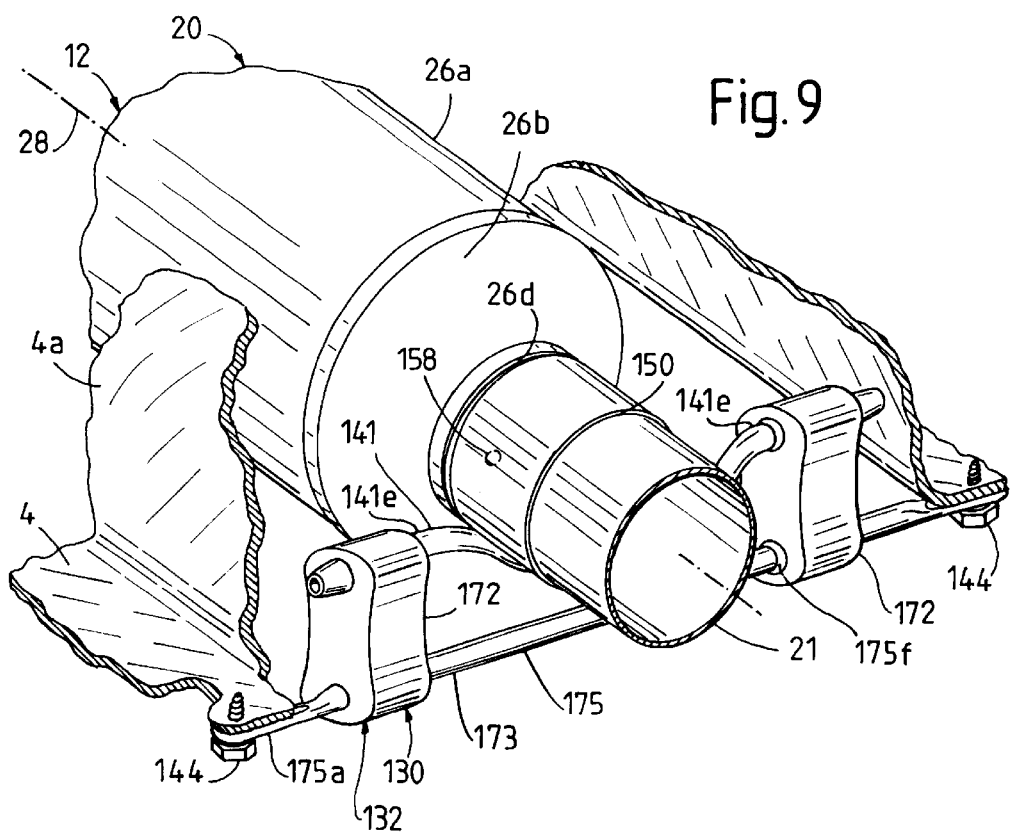
FIG. 9 shows an oblique view of the outlet end of the silencer according to FIGS. 5 to 7.

FIG. 9 shows the second holder 132, which is connected at the outlet end of the first silencer 20 to the pipe 21 and has a retaining member, two damping elements, a connecting element and a reinforcing element. The retaining member of the second holder is formed identically or similarly to the retaining member 141 of the first holder 131 and is likewise denoted by 141. Each of the two vibration damping elements 172 of the second holder 132 once again consists of an elastomeric member, which however has only two holes, namely an upper hole and a lower hole, instead of three holes. These two holes are once again continuous, parallel to one another, essentially cylindrical and circular in cross-section. The connecting element of the second holder is denote by 173 and consists of a single hollow rod 175 formed as a thin tube. The holder rod 175 is for the most part cylindrical, circular in cross-section and straight, but has, at both ends, a flattened end section 175a with a hole and two beads 175f Each arm 141e of the retaining member 141 of the second holder 132 passes through the upper hole of one of the two damping elements 172 analogously to the first holder. The hollow rod 175 of the connecting element 173 passes through the lower hole of the two damping elements and rests with its beads 175f against the inner surfaces of the two damping elements. The two damping elements 172 connect the retaining member 141 in a vibration-damping manner to the connecting member. The reinforcing element coordinated with the second holder 132 and/or possibly belonging to the latter is denoted by 150, as in the case of the first holder. The retaining member 141 of the second holder 32 adjoins the reinforcing element 150 coordinated with this holder analogously to that of the first holder. The reinforcing element 150 coordinated with the second holder again rests with a portion of the outside against the retaining member 141 of the second holder and is connected to the pipe 21 by spot weld joints 158 and to the retaining member 141 by brazing joints. The connecting member 173 of the second holder is fastened by means of bolts 144 to the underside of the vehicle bottom 4, analogously to that of the first holder.

The retaining members 141 and connecting elements 143, 173 of the two holders 131, 132 are located on the underside of the pipes held by them. The hollow rods or thin pipes of the retaining members and the connecting elements 143, 173 are in outline approximately or exactly transverse to the axes of those sections of the pipes 19 and 21 which are connected to them and the housing axis 28. The retaining member 141 of each holder 131, 132 is—as in the case of the first embodiment—connected in outline on different sides of the held pipe 19 or 21 by one of the damping elements 142 or 172 to a connecting element 143 or 173, respectively, which in turn is fastened on different sides of the pipe 19 or 21 and of the tunnel 4a on the vehicle bottom 4. The retaining members 141 of the two holders 131, 132 are located completely inside the tunnel 4a. The damping elements 142, 172 of the two holders 131, 132 are located partly in the tunnel.

Figure 7:
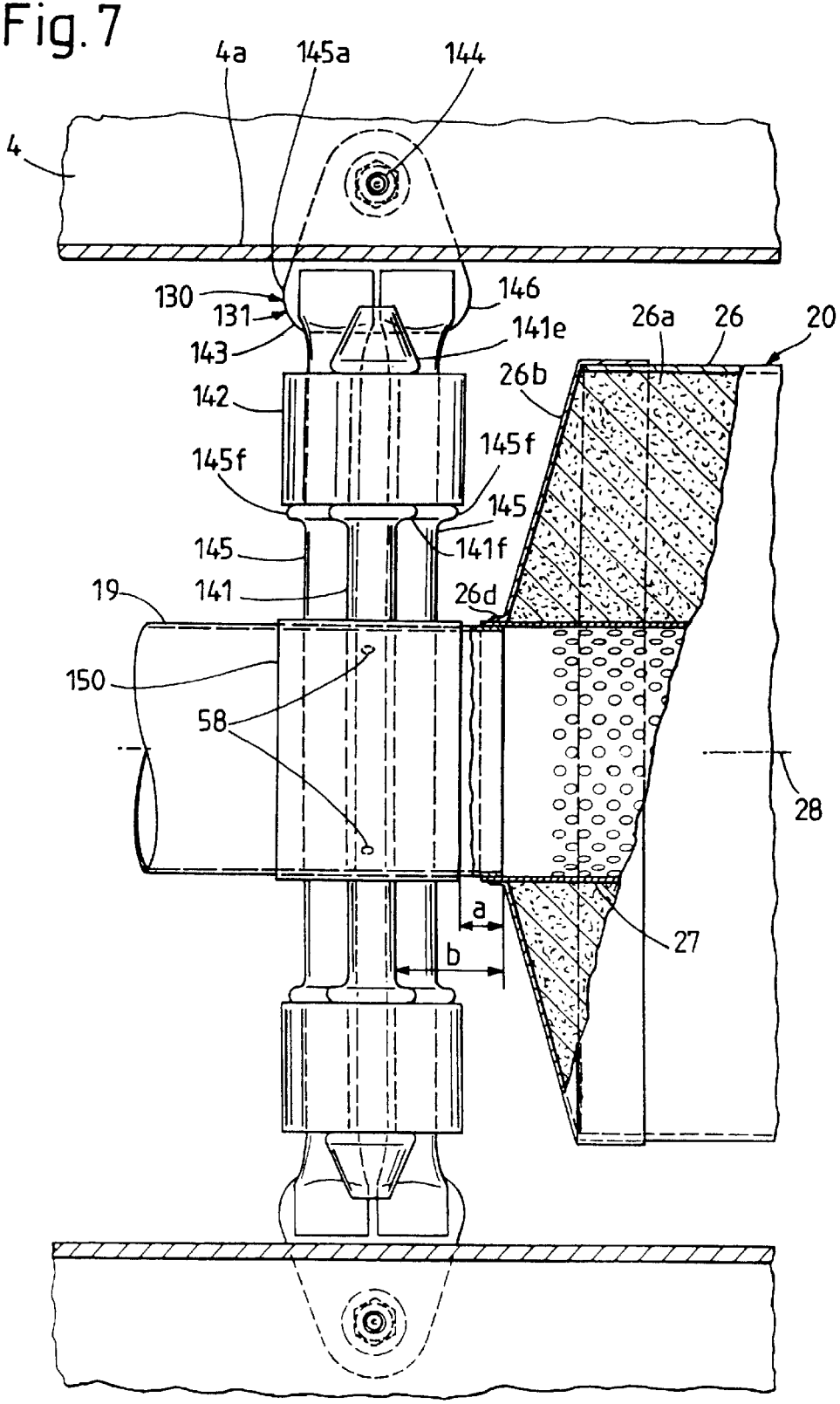
FIG. 7 shows a horizontal longitudinal section through the inlet end of a silencer according to FIGS. 5 and 6 and a plan view of the holder arranged there, on a larger scale than FIG. 6.
Figure 8:
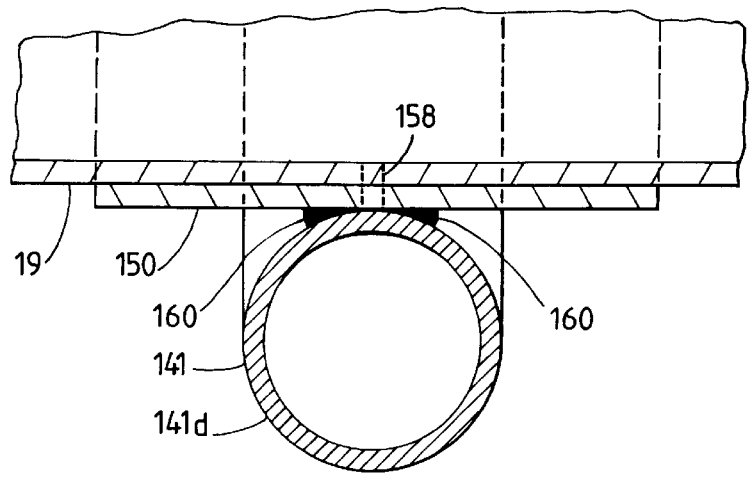
FIG. 8 shows a vertical section through a part of the pipe connected to the inlet end of the silencer and through the retaining member connected to said pipe, the section running along the axis of the pipe of the exhaust.

FIG. 7 also shows the distances a and b. These have meanings analogous to the corresponding distances shown in FIG. 4 and may also be of the same orders of magnitude.

The second silencer 22 not shown in FIGS. 5 to 9 may be connected, in the vicinity of its two ends, at the pipes connected to it, to the vehicle bottom by means of a third holder and a fourth holder. These holders may be formed more or less similarly to the second holder 132 and in particular, like this, may have a connecting element which has only a single hollow rod passing through two damping elements. However, since the second silencer is located, for example, behind the tunnel, the connecting members of the third and fourth holder must be fastened differently to the vehicle bottom. If the retaining members and hollow rods of the connecting elements of the third and fourth holder are located, analogously to the first and second holder, on the underside of the exhaust pipe, the connecting members of the second and third holder may then also have, for example, fastening parts which project upwards away from the ends of the essentially straight, hollow rods 175 towards the vehicle bottom and are fastened to the latter. The retaining members and the hollow rods 175 of the connecting elements of the third and fourth holder may however be arranged on the top instead of on the underside of the pipes connected to them. The retaining members connected via reinforcing elements to the pipes may then be suspended by means of the damping elements from those hollow rods 175 of the connecting elements which are located above them, so that the middle sections of the hollow rods 175 are present fairly close to the vehicle bottom. It may then be sufficient, for example, slightly to lengthen and to bend those end sections of the rods 175 which project from the damping elements, in such a way that they rest against, and can be fastened to, the vehicle bottom.

The holes of the two damping elements 142, 172 belonging to the same holder are aligned with one another in pairs and, in the normal position of the motor vehicle, have, for example, approximately horizontal axes. The retaining member 141 of the first holder 131 is then located approximately vertically above the intermediate space between the two hollow rods 145 of the connecting element. The retaining member 141 of the second holder 132 is also located above the hollow rod 175 of the connecting element 173 but may move slightly in a manner to be described. Furthermore, it is initially assumed that the exhaust 12 in outline is completely straight and, for example, parallel to the longitudinal direction of the vehicle from the pipe 19 to the pipe 23. The hollow rods which form the retaining members and at least substantial parts of the connecting element may then, in outline, be arranged exactly transverse to the housing axes and pipe axes, so that the holes of the elastomeric members of the damping elements and those sections of the hollow rods passing through them are exactly at right angles to the longitudinal direction of the pipes held by the holders.

Since the connecting element 143 of the first holder 131 has two hollow rods, the damping elements 142 of the first holder 131 cannot swivel about the connecting element and therefore connect the retaining member 141 essentially non-swivelling to the connecting element 143. The first holder 131 therefore connects the pipe 19, which connects the second elastically deformable and flexible pipe element 18 to the inlet of the first silencer, in a vibration-damping manner but otherwise relatively firmly in all directions and with little movement, to the vehicle bottom. On the other hand, the damping elements 172 of the second holder 132 and the identically formed damping elements of all other holders located along the exhaust downstream of the first holder can swivel about the retaining member 141 and about the hollow rod 175 of the connecting element 173. The retaining member 141 of the second and each subsequent holder can accordingly swivel about the connecting element 173 and about a swivel axis which is approximately or precisely perpendicular to the longitudinal direction of the pipe held by the holder. The swivel axis is preferably approximately or precisely horizontal when the motor vehicle is in the normal position.

During operation of the internal combustion engine, hot exhaust gas flows through the exhaust, so that the latter is heated and expands. When the engine is cold and the motor vehicle is in the normal position, the retaining member belonging to the second holder may be located approximately perpendicularly above the hollow rod 175 of the connecting element 173 or slightly upstream and above it. If the exhaust expands on heating, the retaining members of the holders following the first holder can be swivelled about the hollow rods of the connecting elements of these holders and thus absorb the changes in length of the exhaust. On the other hand, the holders following the first holder connect the exhaust parts held by them, in all directions approximately at right angles to the longitudinal direction of the exhaust, relatively firmly and virtually nondisplaceably to the vehicle bottom.

The various holders support in particular the exhaust part which is located downstream of the second deformable and in particular flexible pipe element 18 and on which forces generated by driving also act in addition to its own weight. Considerable vertical accelerations can be generated in particular by driving over holes, steps and the like. The elastomeric members of all holders are preferably so rigid that the housings and retaining members are deflected not more than 5 mm, preferably not more than 2 mm and advantageously not more than 1 mm in all directions at right angles to the longitudinal direction of the pipes held, by accelerations of 10 m/s$^2$ applied to said exhaust part. At least if the accelerations in the normal position of the motor vehicle which act on said exhaust part-are approximately vertical, even accelerations of 30 m/s$^2$ should preferably cause only deflections of not more than 5 mm, better of not more than 2 mm and preferably not more than 1 mm. The elastomeric members of the first holder 131 are preferably formed in such a way that accelerations of 10 m/s$^2$ or even 30 m/s$^2$ acting on said exhaust part in any direction—i.e.

also in the longitudinal direction—cause only deflections of the retaining member 141 of the first holder of not more than 5 mm, preferably not more than 2 mm or advantageously not more than 1 mm.

It is now assumed that, in outline, the pipe 21 is partly bent and/or angled so that the second silencer in outline is laterally offset relative to the first silencer. In this case, the two holders arranged next to the second silencer and possibly also the holder arranged at the downstream end of the first silencer have retaining members and connecting elements with hollow rods which, in outline, are not exactly at right angles to the pipes held but, for example, are more or less at right angles to a straight connecting line which passes through centres of the two silencers. These retaining members and connecting elements can define pivot axes which form angles of 60° to 120° or preferably of 70° to 110° and, for example, of approximately or precisely 90° with the longitudinal direction of the pipe held and/or of said straight connecting line. The swivel axes are preferably again more or less horizontal when the motor vehicle is in the normal position. The damping elements of the holders arranged next to the second silencer may then swivel along a vertical plane passing approximately or pressing through this connecting line and thus compensate changes in the length of the pipe connecting the two silencers and of the second silencer. These holders should then be deflected by not more than 5 mm, preferably not more than 2 mm and preferably not more than 1 mm in the case of accelerations of 10 m/s$^2$ or even 30 m/s$^2$ in all directions at right angles to said connecting line.

Unless otherwise described above, the holders 131, 132 according to FIGS. 5 to 9 may have similar properties, and may also be produced in a more or less similar manner, to the holders 31 to 34 according to FIGS. 1 to 4. However, the retaining members 141 of the holders 131, 132 are fastened to the sleeve-like reinforcing elements, for example, not by welding but by brazing. Otherwise, the elastomeric members forming the damping elements 142, 172 may be produced, for example, in a very economical manner by producing rods having the desired profile by extrusion or the like and then cutting off or otherwise separating off elastomeric members or damping elements from these. The rigidity of the latter can be adapted to housings and exhausts of different sizes and different weights by varying the thickness of the pieces separated off.

Figure 10:
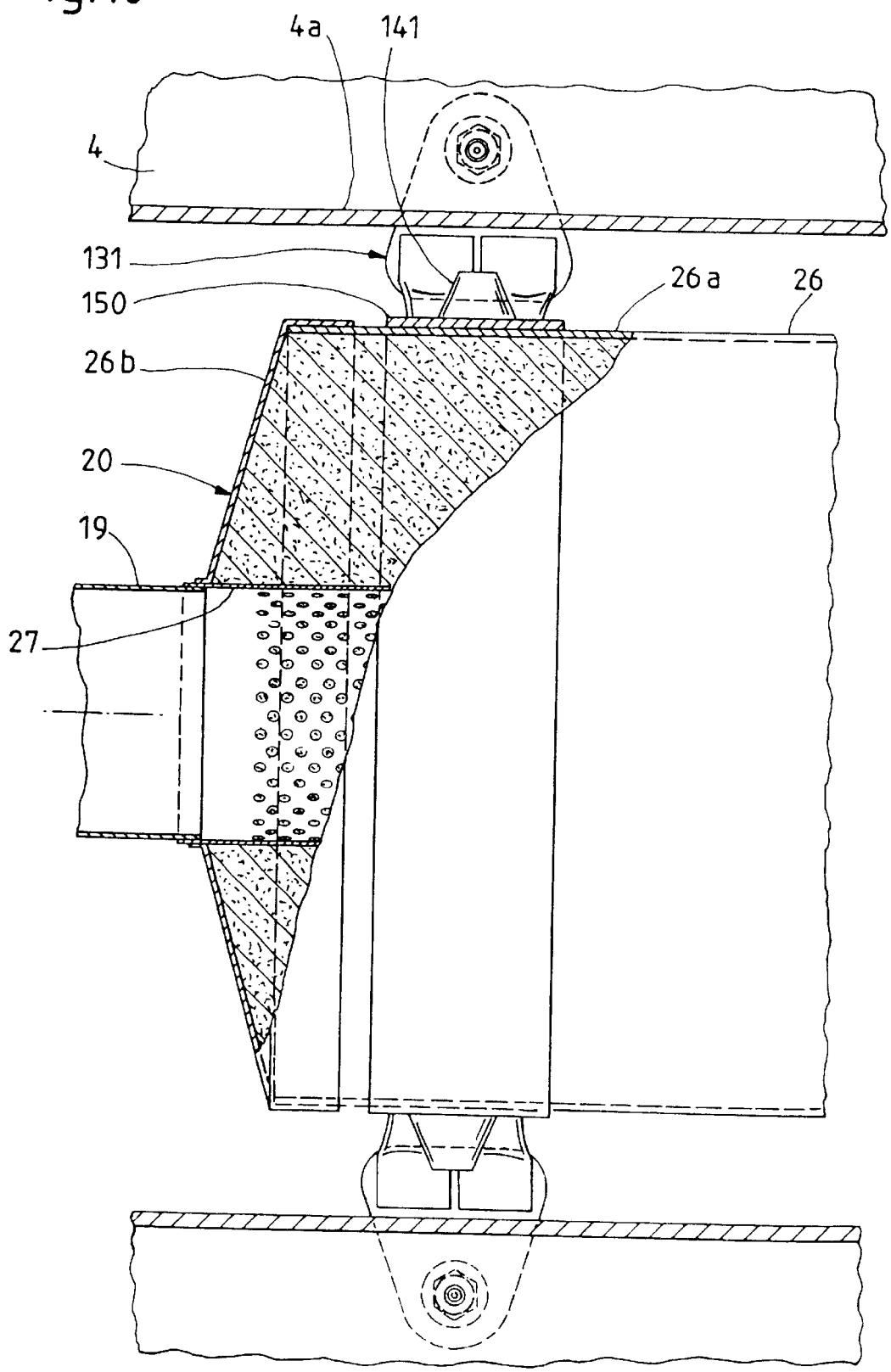
FIG. 10 shows a horizontal longitudinal section through the inlet end of another silencer and a plan view of a holder connected to the housing casing of said silencer.

The variant of a silencer 20 shown in FIG. 10 has again a housing 26 comprising a housing casing 26a. The sleeve-like reinforcing element 150 surrounds in this variant the housing casing 26a and is fastened thereto near the inlet end of the silencer. The holder 131 has a retaining member 141 fastened to the reinforcing element 150. Otherwise, the holder 131 shown in FIG. 10 may be similar to the holder 131 described with respect to the FIGS. 5 to 8. The other, not shown holder associated to the variant of a silencer represented in FIG. 10 may be connected either via a reinforcing element to the housing casing 26a near the outlet end of the silencer or via a reinforcing element to a pipe connected to the outlet end of the silencer analogously as the holder 132 shown in FIG. 9. As far as nothing else has been written, the silencer 20 shown in FIG. 10 may be similar to the silencer 20 described with respect to the FIGS. 5 to 7, wherein the same reference signs designate corresponding, similar or identical parts.

The variant of a silencer 20 shown in FIG. 11 is connected at one of the ends of the silencer, for example at the inlet end, with a pipe 19 which is only very short and has a wall with a wall thickness that may then be possibly more than 1 mm. This pipe 19 can then be connected to a holder 131 without reinforcing so that the retaining member 141 of the holder 131 rests directly on the pipe 19. The retaining member 141 can be fastened to the pipe 19, for example, by brazing joints 160 extending along the whole part of the retaining member 141, which part rests on the pipe 19 analogously as the retaining member 141 shown in the FIGS. 5 to 8 is fastened by brazing joints 160 to the reinforcing element 150. The not show outlet end of the silencer 20 represented in FIG. 11 is connected to a not shown pipe which has a wall thickness of at most 1 mm and which is connected via a sleeve-like reinforcing element to a holder analogously as shown in FIG. 9. As far as nothing else has been written, the silencer 20 shown in FIG. 11 and the holders associated thereto may be similar as it has been described for the variant shown in the FIGS. 5 to 9, wherein the same reference signs designate corresponding, similar or identical parts.

Finally, it should also be mentioned that the exhaust systems described above can be modified in several respects. For example, features of the previously described embodiments may be combined with one another. For example, the retaining members in the case of the two variants shown can be fastened to the reinforcing elements by brazing or welding or possibly even by adhesive bonding. Furthermore, the retaining members which are coordinated with the second silencer 22 arranged behind the tunnel may be arranged on the top instead of on the underside of the pipes 21, 23 also in the case of the system according to FIGS. 1 to 4 and may be suspended from damping elements engaging from above and via these from connecting elements, analogously to what has been mentioned above as a possibility for the exhaust system according to FIGS. 5 to 9. Furthermore, the shape of the elastomeric damping elements may be varied. They may have, for example, mushroom-shaped or otherwise shaped fastening and connecting means which, together with the damping element, consist of an integral member and, in the variant according to FIGS. 1 to 4, may connect the damping elements to the connecting element and to the retaining member, instead of the bolts 47, 48. A damping element can however also have an elastomeric member having at least one cast or vulcanized metallic bush. Furthermore, the holders may possibly also have only one damping element 42.

It is also possible for at least one retaining member to be fastened via a reinforcing element to the housing casing. Furthermore, at least one reinforcing element may be fastened to a pipe or housing casing approximately oval in cross-section and of course then likewise have an approximately oval shape so that it rests against the entire circumference. Instead of consisting of an integral sleeve, a reinforcing element may possibly consist of two or even more parts firmly connected to one another or of a thin metallic strip wound around a pipe or a housing casing and then fixed, for example, by brazing or welding. Instead of a catalytic converter and two silencers, the exhaust system may also have only one catalytic converter and one silencer or two catalytic converters and at least one silencer or a combined catalytic converter/silencer and a further silencer. For example, a catalytic converter, or a catalytic converter having a common housing together with a silencer, could be arranged upstream of the two elastically deformable, flexible pipe elements 16 and 18. A catalytic converter or catalytic converter/silencer arranged in this manner could then have a housing which is connected on both sides to pipes and via these analogously to holders, as was described for the first silencer 20.

Otherwise, reference may also be made to the U.S. Pat. No. 6,058,702 already cited and also to the U.S. Pat. No.

6,173,800 as well as to U.S. Pat. No. 6,260,652 which are hereby incorporated in the present Patent Application by reference thereto.

What is claimed is:

1. An exhaust system for a motor vehicle having a vehicle body and an internal combustion engine, the exhaust system comprising an exhaust to be connected to the internal combustion engine and having at least one housing of at least one of a silencer and a catalytic converter and formed as a tubular casing which has a material thickness of not more than 1 mm, and two housing ends at least one of which is rigidly connected to a metallic, exhaust gas-carrying pipe having a material thickness of not more than 1 mm; retaining means for holding the exhaust on the vehicle body; at least one reinforcing element at least partially surrounding one of the metallic pipe and the tubular casing and fastened to the one of the metallic pipe and the tubular casing; and at least one vibration damping element connectable to the vehicle body, wherein the retaining means comprises at least one holder having a retaining member connected to the reinforcing element and to the at least one vibration damping element, wherein the retaining member of the at least one holder has a middle section which is one of connected, via the reinforcing element, to the one of the metallic pipe and the tubular casing and connected directly to the metallic pipe and has two arms which project sidewise of the middle section in opposite directions, and wherein each arm is connected to the vibration damping element which is at least partly elastomeric, wherein the exhaust defines an exhaust gas flow path, the at least one holder is arranged along the flow path, and the retaining means comprises at least one subsequent holder following the at least one holder along the flow path, and wherein damping elements of the at least one holder connect the retaining member thereof to connecting element of the at least one holder without a possibility of a pivotal movement of the retaining member relative to the connecting element, and damping elements of the at least one subsequent holder connect a retaining member of the at least one subsequent holder to the connecting element of the at least one subsequent holder with a possibility of rotation of the retaining member of the at least one subsequent holder to the connecting element thereof.

2. An exhaust system according to claim 1, wherein the at least one reinforcing element is fastened to the one of the metallic pipe and the tubular casing by at least one of pressing on, welding, brazing, plastic deformation, and adhesive bonding.

3. An exhaust system according to claim 1, wherein another one of the two housing ends is connected to a further pipe, wherein the retaining means includes two further holders for the metallic pipe and a further pipe, respectively, and having each a metallic retaining member, wherein the at least one reinforcing element is fastened to the metallic pipe, wherein the exhaust system further comprises a further reinforcing element surrounding the further pipe, and the retaining member of a further holder associated with the further pipe is one of fastened to the reinforcing element associated with the further pipe and fastened directly to the further pipe.

4. An exhaust system according to claim 1, wherein another end of the housing is connected to a further pipe also having a material thickness of no more than 1 mm, wherein the exhaust system further comprises a further reinforcing element at least partially surrounding the further pipe and fastened to the further pipe, wherein the retaining means comprises a further holder having a retaining member connected to the further reinforcing element.

5. An exhaust system according to claim 1, wherein the retaining member of the at least one holder is connected to the at least one reinforcing element by one of welding, brazing, and adhesive bonding.

6. An exhaust system according to claim 3, wherein at least one subsequent holder likewise has a middle section and two arms which project sidewise of the middle section in the opposite directions, wherein the damping elements of respective holders connect the connecting elements of the respective holders to the two arm of the respective holders, and wherein each respective connecting element is rigidly connectable to the vehicle body.

7. An exhaust system according to claim 1, wherein the retaining member of the at least one holder has a thin pipe which forms the middle section of the retaining member, wherein the middle section is connected to the one of the reinforcing element and the metallic pipe by at least one of welding, brazing, and of adhesive bonding, and wherein the thin pipe on both sides of the middle section has a hollow cylindrical section which belong to one of the arms of the retaining member and passes through a cylindrical hole in an elastomeric member of the damping element.

8. An exhaust system according to claim 1, wherein the at least one reinforcing element consists of an integral metallic sleeve continuous along its circumference.

9. An exhaust system according to claim 1, wherein the metallic pipe and the tubular casing has material thickness of not more than 0.8 mm.

10. An exhaust system for a motor vehicle having a vehicle body and an internal combustion engine, the exhaust system comprising an exhaust to be connected to the internal combustion engine, and defining an exhaust gas flow path, and having at least one deformable pipe element, and at least one housing of at least one of a silencer and a catalytic converter arranged downstream of the at least one deformable pipe element and formed as a tubular casing which has a material thickness of not more than 1 mm, and two housing ends at least one of which is rigidly connected to a metallic, exhaust gas-carrying pipe having a material thickness of not more than 1 mm; retaining means for holding the exhaust downstream of the at least one deformable pipe element on the vehicle body, the retaining means having a first holder along the flow path and at least one subsequent holder following the first holder along the flow path, wherein each holder comprises a retaining member rigidly connected to a part of the exhaust, a connecting element connectable to the vehicle body and at least one vibration damping element connecting the retaining member to the connecting element, wherein the retaining member of at least one of the holders is connected via a reinforcing element to one of the metallic pipe and the tubular casing, wherein the reinforcing element at least partially surrounds the one of the metallic pipe and the tubular casing, is fastened to the one of the metallic pipe and the tubular casing, and has an outside which adjoins the retaining member, and wherein the at least one vibration damping element of the first holder connects the retaining member thereof to the connecting element thereof without the possibility of pivotal movement of the retaining member relative to the connecting element, and wherein the at least one vibration damping element of the at least one subsequent holder connects the retaining member thereof to the connecting element thereof with the possibility of pivotal movement of the retaining member relative to the connecting element.

11. An exhaust system according to claim 10, wherein the reinforcing element is formed as an integral metallic sleeve which surrounds the one of the metallic pipe and the tubular casing, and is connected to the one of the metallic pipe and the tubular casing by at least one of pressing, welding, brazing, plastic deformation, and adhesive bonding, and wherein the retaining member is metallic and is fastened to the reinforcing element by at least one of welding, brazing, and adhesive bonding.

12. An exhaust according to claim 10, wherein the tubular casing, the metallic pipe, and the reinforcing element have each a thickness of not more than 0.8 mm.

13. An exhaust system according to claim 10, wherein the at least one housing is rigidly connected at another housing end to a further pipe having a material thickness of not more than 1 mm, and is connected, via a reinforcing element, to the retaining member of one of the holders.

14. An exhaust system according to claim 10, wherein the retaining member of each holder has a middle section and two arms which project on opposite sides of the middle section in opposite directions, wherein the middle section of the retaining member of each holder is connected to a part of the exhaust one of via the reinforcing element and directly, and wherein each arm of the retaining member is connected by a vibration damping element to the connecting element.

15. An exhaust system according to claim 14, wherein each vibration damping element of each holder comprises an elastomeric member formed of at least one of synthetic and natural rubber, wherein each arm of each retaining member penetrates a hole of the elastomeric member, wherein the elastomeric members belonging to the at least one subsequent holder can pivot about the arms of the retaining member, wherein the connecting element of the first holder has two rods each penetrating a hole of each elastomeric member of the first holder, wherein the connecting element of the at least one subsequent holder has a rod which penetrates a hole of each elastomeric member of the at least one subsequent holder, and wherein the elastomeric members of the at least one subsequent holder can pivot about the rod of the connecting element.

16. An exhaust system according to claim 10, wherein the retaining member of the at least one subsequent holder can pivot about a pivot axis relative to the connecting member, and wherein this pivot axis forms an angle of 60° to 120° with at least one of a longitudinal direction of the exhaust part to which the at least one subsequent holder is connected, and a line passing through centers of the at least one housing and a further housing disposed downstream of the at least one housing.

17. A motor vehicle comprising a vehicle body; an internal combustion engine; and an exhaust system having an exhaust to be connected to the internal combustion engine, defining an exhaust gas flow path and having at least one deformable pipe element, and at least one housing of at least one of a silencer and a catalytic converter arranged downstream of the at least one deformable pipe element and formed as a tubular casing which has a material thickness of not more than 1 mm, and two housing ends at least one of which is rigidly connected to a metallic, exhaust gas-carrying pipe having a material thickness of not more than 1 mm; retaining means for holding the exhaust downstream of the at least one deformable pipe element on the vehicle body, the retaining means having a first holder along the flow path and at least one subsequent holder following the first holder along the flow path, wherein each holder comprises a retaining member rigidly connected to a part of the exhaust, a connecting element connectable to the vehicle body, and at least one vibration damping element connecting the retaining member to the connecting element, wherein the retaining member of at least one of the holders is connected via a reinforcing element to one of the metallic pipe and the tubular casing, wherein the reinforcing element at least partially surrounds the one of the metallic pipe and the tubular casing, is fastened to one of the metallic pipe and the tubular casing, and has an outside which adjoins the retaining member, and wherein the at least one vibration damping element of the first holder connects the retaining member thereof to the connecting element thereof without the possibility of pivotal movement of the retaining member relative to the connecting element, wherein the at least one vibration damping element of the first holder connects the retaining member of the first holder in such a manner to the connecting element of the first holder that an acceleration of 10 m/s² acting on the exhaust in any direction deflects the retaining member of the first holder not more than 5 mm, and wherein the at least one vibration damping element of the at least one subsequent holder connects the retaining element of this holder in such a manner to the connecting element of this holder that an acceleration of 10 m/s² acting on the exhaust in a direction, which is approximately perpendicular to at least one of a longitudinal direction of an exhaust part held by the retaining member and a line which connects centers of the at least one housing and a further housing disposed downstream of the at least one housing, deflects the retaining member of the at least one subsequent holder not more than 5 mm.

18. An exhaust system for a motor vehicle having a vehicle body and an internal combustion engine, the exhaust system comprising an exhaust to be connected to the internal combustion engine and having at least one housing of at least one of a silencer and a catalytic converter and formed as a tubular casing which has a material thickness of not more than 1 mm, and two housing ends at least one of which is rigidly connected to a metallic, exhaust gas-carrying pipe having a material thickness of not more than 1 mm; retaining means for holding the exhaust downstream of the at least one deformable pipe element on the vehicle body, the retaining means having a first holder along the flow path and at least one subsequent holder following the first holder along the flow path, wherein each holder comprises a retaining member rigidly connected to a part of the exhaust, a connecting element connectable to the vehicle body, and two vibration damping elements, wherein the retaining member of each holder has a middle section and two arms which project sidewise on opposite sides of the middle section in opposite directions, wherein the middle section of the retaining member of each holder is rigidly connected to a part of the exhaust, wherein each arm of the retaining member is connected by one of the vibration damping elements to the connecting element, wherein the vibration damping elements of the first holder connect the retaining member thereof to the connecting element thereof without a possibility of a pivotal movement of the retaining member relative to the connecting elements, and wherein the vibration damping elements of the at least one subsequent holder connect the retaining member thereof to the connecting element thereof with a possibility of pivotal movement of the retaining member relative to the connecting element.

* * * * *